United States Patent
Draper (10) Patent No.: US 10,982,444 B1
(45) Date of Patent: Apr. 20, 2021

(54) TENSILE REINFORCEMENTS FOR CONCRETE SLAB

(71) Applicant: Mettler-Toledo, LLC, Columbus, OH (US)

(72) Inventor: Craig Draper, Ashley, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 0 days.

(21) Appl. No.: 16/583,636

(22) Filed: Sep. 26, 2019

(51) Int. Cl.
  *E04C 5/18* (2006.01)
  *G01G 19/02* (2006.01)

(52) U.S. Cl.
  CPC ............... *E04C 5/18* (2013.01); *G01G 19/02* (2013.01)

(58) Field of Classification Search
  CPC ............ G01G 19/02; E04C 5/18; E04C 5/205
  See application file for complete search history.

(56) References Cited

U.S. PATENT DOCUMENTS

| | | | | |
|---|---|---|---|---|
| 4,066,140 A | * | 1/1978 | Conley | G01G 19/021 177/134 |
| 4,280,576 A | * | 7/1981 | Smith, Jr. | G01G 19/02 177/126 |
| 4,392,537 A | * | 7/1983 | Lundborg | G01G 19/02 177/134 |
| 4,575,985 A | | 3/1986 | Eckenrodt | |
| 4,800,971 A | * | 1/1989 | Dillon | G01G 19/02 177/134 |
| 4,831,675 A | | 5/1989 | Nedelcu | |
| 4,874,050 A | | 10/1989 | Strasser et al. | |
| 7,506,482 B2 | | 3/2009 | Sorkin | |
| 7,584,585 B2 | | 9/2009 | Kilby | |
| 7,637,072 B2 | | 12/2009 | Parish | |
| 10,280,623 B1 | | 5/2019 | Verelli et al. | |

(Continued)

FOREIGN PATENT DOCUMENTS

| | | |
|---|---|---|
| CN | 202064274 U | 12/2011 |
| CN | 103090951 A | 5/2013 |

(Continued)

OTHER PUBLICATIONS

Ashoka Metal Works & Co., Pit Mounted Weighbridge, accessed online Jul. 24, 2019 at http://www.everlast-india.com/pit-mounted-weighbridge.html, 2011, 2 pages.

(Continued)

*Primary Examiner* — Adriana Figueroa
(74) *Attorney, Agent, or Firm* — Standley Law Group LLP; Jeffrey S. Standley; Stephen L. Grant (57) ABSTRACT

A module for configuring a weighbridge has a rectangular frame with a pair of parallel side edges and a pair of parallel end edges, which are shorter than the side edges, and a pair of rails, parallel to the side edges and affixed to the end edges. The rails and end edges define an interior of the rectangular frame, arranged to have concrete poured therein. There are also means for increasing the ability of the poured concrete to handle tensile forces, located in the interior. A first of these is a plurality of rebar chair strips for locating and retaining rebars. Each of these has an elongate metal bar with a lower edge and an upper edge, along which a plurality of rebar support sites are provided in spaced-apart relationship.

16 Claims, 5 Drawing Sheets

(56) References Cited

U.S. PATENT DOCUMENTS

| | | |
|---|---|---|
| 2008/0028718 A1 | 2/2008 | Erickson et al. |
| 2008/0118304 A1 | 5/2008 | Carraher et al. |
| 2008/0209843 A1 | 9/2008 | Helms |
| 2009/0100784 A1 | 4/2009 | Garza et al. |
| 2011/0047915 A1 | 3/2011 | Waters, Jr. et al. |
| 2011/0072751 A1* | 3/2011 | Clear .................... E04C 5/0645 52/415 |
| 2011/0266073 A1* | 11/2011 | Evesque ................ G01G 21/22 177/133 |
| 2013/0125498 A1 | 5/2013 | Lowery |
| 2017/0254086 A1 | 9/2017 | Larkin |
| 2019/0048555 A1* | 2/2019 | Jahnke .................... E02D 27/35 |
| 2019/0136534 A1 | 5/2019 | Verelli et al. |
| 2020/0040581 A1* | 2/2020 | Paulger ................... E04C 5/168 |

FOREIGN PATENT DOCUMENTS

| | | | | |
|---|---|---|---|---|
| DE | 202019004421 U1 * | 11/2019 | ............ | E04C 5/163 |
| EP | 0139204 A2 | 5/1985 | | |
| EP | 0138043 B1 | 11/1988 | | |
| EP | 2975189 A1 * | 1/2016 | ............... | E04C 5/20 |
| ES | 478550 A1 | 5/1979 | | |
| FR | 2841981 A1 * | 1/2004 | ............ | G01G 19/02 |
| GB | 823630 A * | 11/1959 | ............ | G01G 19/02 |
| GB | 843677 A * | 8/1960 | ............ | G01G 19/02 |
| WO | WO-2016005917 A1 * | 1/2016 | ............... | E04C 5/18 |

OTHER PUBLICATIONS

Hiweigh, THM H-beams Weighbridge, accessed online Jul. 24, 2019 at http://www.hiweigh.com/wp-content/uploads/2017/06/THM-HiWEIGH-2018.pdf, 1 page.

* cited by examiner

TENSILE REINFORCEMENTS FOR CONCRETE SLAB

CROSS-REFERENCE TO RELATED APPLICATIONS

This non-provisional patent application makes no claim of priority.

TECHNICAL FIELD

The invention relates to tensile reinforcements for concrete slab, with particular application to concrete slab poured to provide a body for a module used to configure a weighbridge, especially weighbridge built from more than one of the modules. A first feature includes chairs to locate and retain reinforcing bars ("rebars") during the pouring of the concrete slab. A second feature includes angled ribs for increasing purchase between the concrete slab and the module. In some aspects, both features are combined.

BACKGROUND ART

When trucks are used to transport products over the roads, knowing the weight of each axle group is important to assure compliance with local road weight restrictions. In many of these applications, it is also desired to process a transaction for the product being transported. This is done with a legal-for-trade truck scale. It is often desirable to be able to achieve both of these objectives with a single device.

One type of truck scale is known as a weighbridge. These are notably larger in plan view than an axle scale. In one variation, all axles of the truck being weighed are positioned on a unitary weigh platform, even if that unitary platform comprises a plurality of modules that have been joined together. The weight obtained on such a weighbridge can provide a "legal for trade" weight by subtracting a known tare weight for the tractor and the empty trailer. This weighbridge cannot provide the weight of an individual axle or axle group.

The second type of weighbridge, referred to as a "multi-axle weighbridge," has a weigh platform that is separated into a plurality of sections along the length thereof. When a truck is driven onto the weighbridge, each axle or axle group rests upon its own platform section, although some platform sections may have no axles or axle groups resting thereupon. The multi-axle weighbridge provides accurate individual axle weights and total weight information in a single weighing procedure.

It is a desirable goal to construct a weighbridge from modular units. Such units are commonly either steel or a composite of steel and concrete known as reinforced concrete. Concrete is strong in compression but weak in tension, so steel is used to carry all of the tensile stresses in the structure. For this to happen, the concrete must be bonded to the steel members for transfer of stresses. Because adhesive properties between concrete and steel are relatively weak; smooth reinforcing bars are generally ineffective. To increase the bond, deformations are added to the bar or a welded mesh is commonly used.

In a similar way, ribs in weighbridge modules require some means of binding the concrete and steel. Commonly, ribs are either formed or structural shapes, such as I-beam or channels, where the flanges constrain the encased concrete. Another method used is to add holes or weld studs to steel plate so that the cured concrete is constrained by these features. The additional features of these profiles add cost.

An unmet objective of the prior art is to provide a cost-effective solution that gives adequate reinforcement that is sufficiently constrained to the concrete. At present, flat material (i.e. plate, sheet or bar) that can be simply sawn or sheared to size is the lowest cost solution. Further unmet objectives involve the use of chairs to locate and retain reinforcing bars in position during the pouring of concrete and to provide tensile elements in the concrete slab after pouring.

SUMMARY

These and other objectives of the prior art are achieved by a module for configuring a weighbridge. Such a weighbridge comprises a rectangular frame with a pair of parallel side edges and a pair of parallel end edges, the side edges longer than the end edges, with a pair of rails, parallel to the side edges and affixed to the end edges, the rails and end edges defining an interior of the rectangular frame, arranged to have concrete poured therein; and a means for increasing the ability of the poured concrete to handle tensile forces, located in the interior.

In some of the embodiments, the means for increasing the ability of the poured concrete to handle tensile forces comprises a plurality of rebar chair strips for locating and retaining rebars. Each of these rebar chair strips comprises an elongate metal bar with a lower edge and an upper edge, wherein a plurality of rebar support sites are provided in spaced-apart relationship along a length of the upper edge. Each of the rebar support sites comprises a saddle portion defined by an arcuate region and a tongue, the arcuate region sized and adapted to seat a rebar therein and the tongue extending above and beyond the arcuate region, providing an essentially "C"-shaped opening which is closed by deforming the tongue onto the seated rebar.

In many embodiments, each rebar support site further comprises, adjacent to the saddle portion, a "negative" saddle portion comprising a disc-shaped solid portion that corresponds in size to the arcuate region of the saddle portion and an open channel that corresponds in size to the tongue, the "negative" saddle portion positioned in a mirror image relationship with the saddle portion.

In some of these embodiments, the lower edge comprises, when viewed in profile, an alternating series of flat valleys and flat crests, the flat valleys defining base portions upon which the strip of rebar chairs can rest. In some of these, the alternating series of flat valleys and flat crests are configured as a trapezoidal waveform with inclining and declining ramps between the flat valleys and flat crests. In others of these, the alternating series of flat valleys and flat crests are configured as a square waveform with step-wise ramps between the flat valleys and flat crests.

In some embodiments, the means for increasing the ability of the poured concrete to handle tensile forces comprises a plurality of metal bars that run from one end edge to the other, each of the metal bars fixed in place at an incline from the vertical. Of these, in many cases, each of the plurality of metal bars is inclined at an angle of between 10 and 20 degrees. In some of these, a plurality of the metal bars is positioned on each side of a center line of the module that runs from end edge to end edge, such that the plurality of metal bars on opposite sides of the center line are inclined in opposite directions.

In many of the embodiments, the inclined metal bars have an installed height that is lower that the height at which the rebar support sites retain the rebars, leaving the inclined bars and rebars independent of each other.

Other aspects of the inventive concept are achieved by a strip of rebar chairs, comprising an elongate metal bar with a lower edge and an upper edge, wherein a plurality of rebar support sites are provided in spaced-apart relationship along a length of the upper edge. Each of the rebar support sites comprises a saddle portion defined by an arcuate region and a tongue, the arcuate region sized and adapted to seat a rebar therein and the tongue extending above and beyond the arcuate region, providing an essentially "C"-shaped opening which is closed by deforming the tongue onto the seated rebar.

In some of these embodiments, each rebar support site further comprises, adjacent to the saddle portion, a negative saddle portion comprising a disc-shaped solid portion that corresponds in size to the arcuate region of the saddle portion and an open channel that corresponds in size to the tongue, the negative saddle portion positioned in a mirror image relationship with the saddle portion.

In many of these embodiments, the lower edge comprises, when viewed in profile, an alternating series of flat valleys and flat crests, the flat valleys defining base portions upon which the strip of rebar chairs can rest. Of these, in many embodiments, the alternating series of flat valleys and flat crests are configured as a trapezoidal waveform with inclining and declining ramps between the flat valleys and flat crests. In other embodiments, the alternating series of flat valleys and flat crests are configured as a square waveform with vertical or step-wise ramps between the flat valleys and flat crests.

Yet further aspects of the invention are achieved by a method for manufacturing, with minimal material loss, a strip of rebar chairs, the method comprising the steps of:

providing a metal plate having a length, width and a thickness;

cutting the metal plate into a plurality of strips along the length thereof, using an alternating sequence of two types of cutline, such that:

a first of the two types of cutline provides a lower edge for a pair of the strips of rebar chairs and a second of the two types of cutline provides an upper edge of a pair of the strips of rebar chairs, with the respective upper edges of the pair of the strips of rebar chairs having a plurality of rebar support sites arranged therealong;

wherein each of the rebar support sites positioned along the upper edges is a saddle configuration comprising a saddle portion and a negative saddle portion as detailed above.

BRIEF DESCRIPTION OF THE DRAWINGS

A better understanding of the inventive concept will be obtained by reference to the appended drawings, wherein identical parts are identified with identical reference numbers and wherein.

DETAILED DESCRIPTION OF THE EMBODIMENTS

Figure 1:
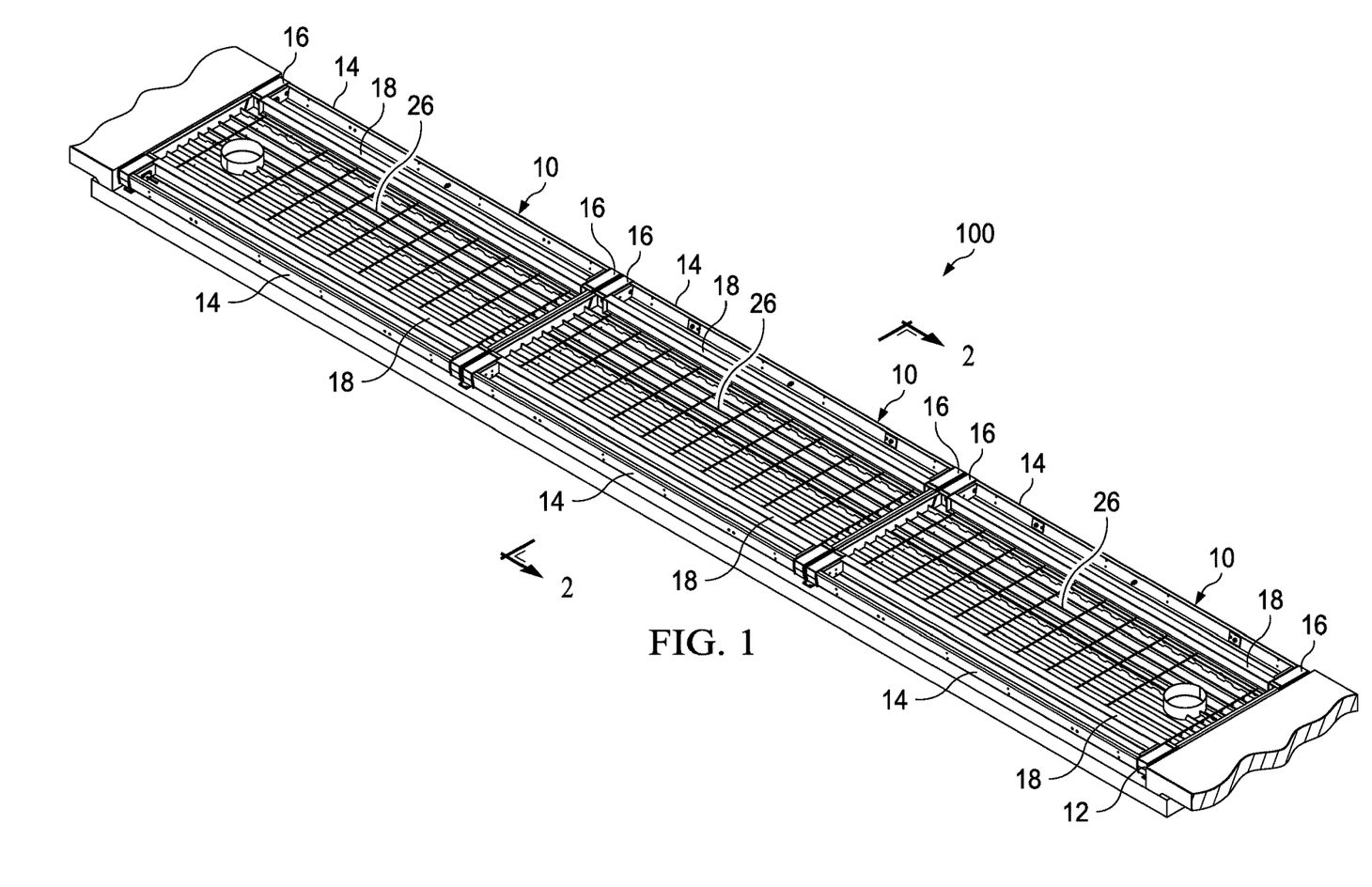
FIG. 1 is a perspective view of a weighbridge constructed from three modules that include the inventive reinforcement features.

FIG. 1 shows a perspective view of a multi-module weighbridge 100, constructed from three identical individual modules 10. Each module 10 has a rectangular frame 12 comprising a pair of parallel side edges 14 and a pair of parallel end edges 16. The end edges 16 are shorter in length than the side edges 14, which may be part of a formed piece of sheet metal that can provide a bottom surface (best viewed in FIG. 2) of the module 10. In the depicted embodiment, the module 10 has a pair of rails 18 that run parallel to the side edges 14. At or near each of the corners where a side edge 14 intersects an end edge 16, a compartment is provided inside a perimeter of the frame 12. These compartments provide a number of functions, but they are used to attach the module 10 to an adjacent module or to associate at least one load cell, located beneath the module as a part of the weighbridge 100, with the module.

The module 10 can be implemented in at least two different modes. In a first mode, the frame 12 supplies a base for receiving a deck plate, typically a steel deck plate. When this is done, an interior 26 of the module 10 will be provided with a system of structural support elements, particularly at or near an upper surface of the module, on which the deck plate is positioned and fastened. This interior 26 is generally defined by the end edges 16, the rails 18 and, when present, the sheet metal providing a bottom surface.

In a second mode, which is the focus of the inventive concept, the frame 12 operates as a structural form into which concrete can be poured, either at a manufacturing facility or at the point of installation. In either of these cases, the interior 26 of frame 12 may be provided with a system of structural elements to reinforce and secure the concrete to the frame.

Figure 2:
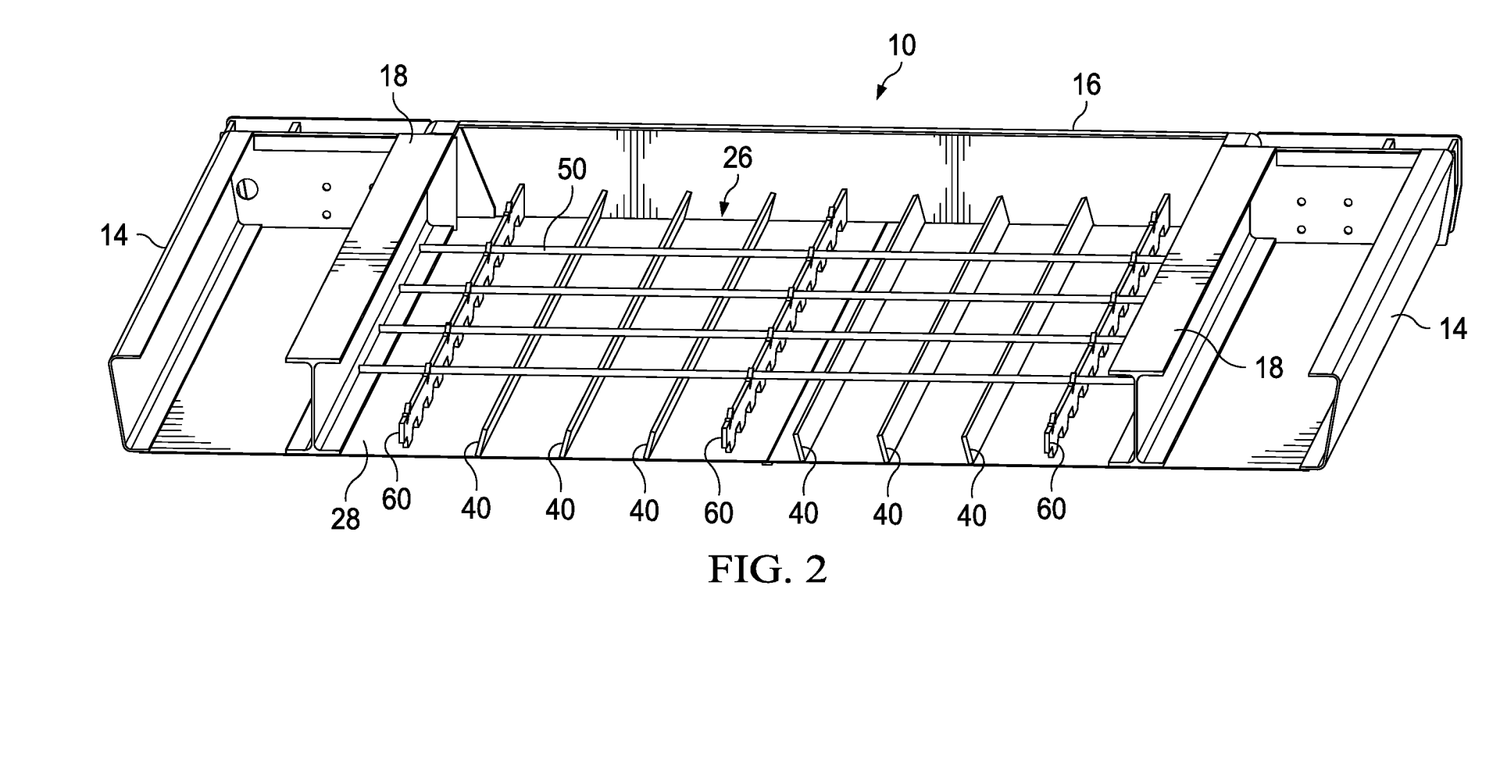
FIG. 2 is an enlarged perspective view taken along line 2-2 of FIG. 1.

With this second mode in mind, attention is now directed to FIG. 2, which shows an enlarged perspective view taken along line 2-2 in FIG. 1. Immediately notable are the parallel side edges 14, the parallel end edges 16 (only one is visible in the section depicted in FIG. 2), and parallel rails 18. In this embodiment of the module, the side edges 14 are part of a formed sheet of metal that operates as a base 28, so that these elements effectively define a pan or interior 26 into which concrete can be poured. Once poured and cured, the concrete serves as a road surface onto which vehicles are driven to be weighed.

Positioned in the interior 26 of the module are two different features that anchor the concrete to the module and take on tensile forces generated in the concrete. A first of these features is a system of metal bars 40 that run the length of the module 10 and which are preferably welded to the respective end edges 16. The bars 40 are can be smooth and flat, but a characteristic feature is that the bars are affixed to the end edges so that the bars 40 are not strictly vertical. Instead, they are oriented at an angle. In the depicted embodiment, three bars 40 positioned to the left of a center line of the module 10 are oriented with their upper edges closer to the center line than their lower edges. The three bars 40 positioned to the right of the center line are oriented with their upper edges closer to the center line than their lower edges. These bars 40 would typically lean at an angle of between about 10 to about 20 degrees from the vertical.

An advantage of the orientation is to position the bars 40 to receive and vector tensile forces acting either vertically or horizontally in the concrete While six bars 40 are depicted in FIG. 2, the exact number of bars is not believed to be critical to the inventive concept, although having at least two bars on each side of the center line is preferred, as is positioning the bars symmetrically on each side of the center line.

Also shown in FIG. 2 are a plurality of reinforcing bars ("rebars") 50 and bars 60 that serve as chairs for the rebars. While these are discussed in more depth with regard to FIGS. 3 to 5, it is notable at this time that the bars 40 have an installed height that is lower than the rebars 50 which pass above them, leaving the bars and rebars independent of each other. Also, and as preferred, one of the chair bars 60 lies along the center line of the module 10 and at least one of the chair bars is positioned, on each side of the module 10, outwardly from the outermost of the bars 40. Of course, it will be noted that this description of the interaction between bars 40 and chair bars 60 assumes that both are present in the interior 26. The presence of both types of bar is clearly preferred.

Figure 3A:
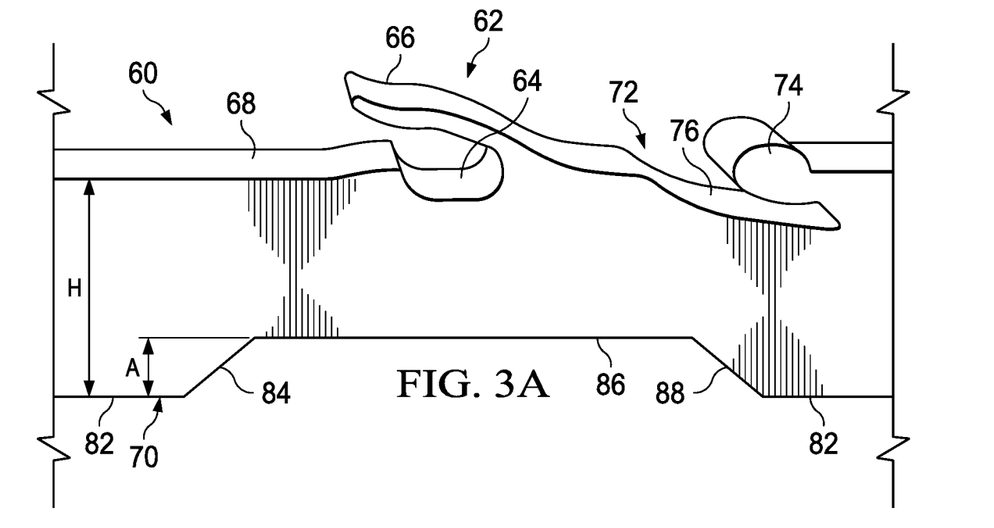
FIG. 3A is an enlarged perspective view of an embodiment of the chair for locating and retaining a rebar, in an open condition.
Figure 3B:
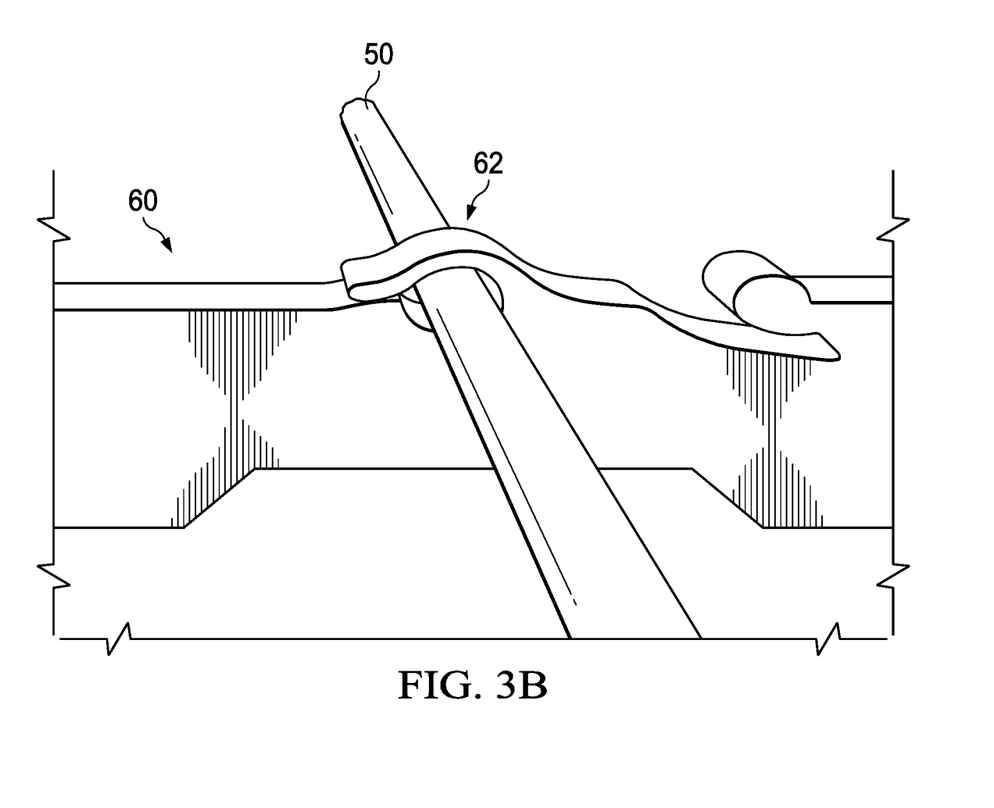
FIG. 3B is an enlarged perspective view showing the FIG. 3A embodiment in a closed condition, retaining a rebar.

FIGS. 3A and 3B show, in enlarged perspective view, a portion of a strip or sheet of the chair bars 60 that are a feature of the inventive concept. In FIG. 3A, the chair bar 60 is an open or unoccupied condition; in FIG. 3B, the chair bar is shown with a rod of rebar 50 engaged in a saddle portion 62 of the chair bar. Focusing on the saddle portion 62, it is seen to comprise an arcuate region 64 that provides the seat to receive the rebar 50, with a deformable tongue 66 that extends above and beyond the arcuate region, providing an essentially "C"-shaped opening. Due to the metal used, the thickness of the tongue 66, and the depth of the chair bar 60, the saddle portion 62 can receive a rebar 50. A user, with a tool such as a hammer, can deform the tongue 66 from the open position of FIG. 3A to the closed position of FIG. 3B. When this occurs, the rebar 50 is secured from movement along the strip of chair bars 60 and is also retained above the from movement along the base of the module in which the chair bar is deployed. This latter restraint is particularly useful during pouring of the concrete into the module interior. Because the saddle portion 62 is formed along a top edge 68 of the chair bar 60, the rebar 50 is positioned at an approximate height H above the base of the module.

The saddle portion 62 of the chair bar 60 is only one of at least two additional features, one of which is also along the top edge 68 and the second of which is along a bottom edge 70. Looking first at the top edge 68 in either FIG. 3A or 3B, it is noted that there is a "negative" saddle portion 72, which comprises a disc-shaped solid portion 74 that corresponds to the arcuate region 64 and an open channel 76 that corresponds to the tongue 66. While the "negative" saddle portion 72, which is positioned in a mirror image relationship to the saddle portion serves little to no purpose in the functionality of the chair bar 60, it provides a considerable advantage in the ability to efficiently manufacture the strips of chair bar in an efficiently manner with low waste of material. As this issue will be dealt with in more detail below, it will be useful to refer to the portion of the top edge 68 of the chair bar strip which contains both the saddle portion and the negative saddle portion as the saddle configuration 80.

Referring now to either FIG. 3A or 3B, focus is directed to the bottom edge 70. In the depicted embodiment, the bottom edge is not linear. Instead, it is cut in the profile of a trapezoidal waveform, so that, moving from left to right, a horizontal valley 82 is followed by an upward incline 84, a horizontal crest 86, and a downward incline 88 that returns to the horizontal valley. The height H used above to refer to the distance between the base on which the chair bar 60 rests is actually the distance between the horizontal valley 82 and the top edge 68, as the chair bar 60 rests upon the sequence of horizontal valleys. The vertical distance between the horizontal valley 82 and the horizontal crest will be designated as the amplitude A of the waveform, whether trapezoidal or rectangular. Although the chair bar 60 described herein can be used to achieve the objectives of the invention as long as the bottom edge 70 has at least flat edge portions, such as horizontal valleys 82 upon which to rest and the top edge 68 has at least saddle configurations 80 arranged therealong, further benefits are achieved when there is a coordination of the elements of the top and bottom edges. In FIGS. 3A and 3B, for example, the arcuate region 64 of a saddle configuration is vertically above a midpoint of a horizontal crest 86.

Figure 4:
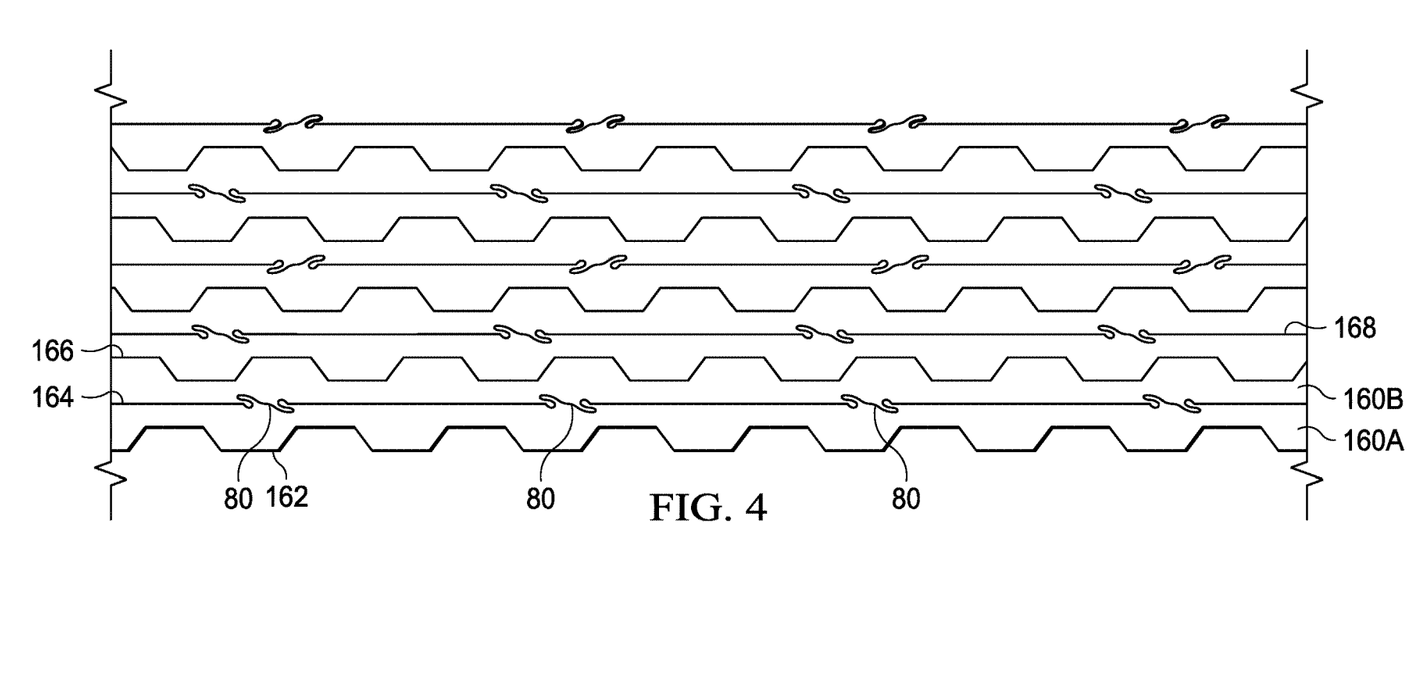
FIG. 4 is a plan view of a metal plate, showing cutlines used to produce a second embodiment of the chair for locating and retaining a rebar.

Turning now to FIG. 4, a plan view of a portion of a metal plate is disclosed, showing a pattern of cutlines to produce, with minimal material loss, a plurality of bars of chairs 160, which is a variation on the chair bar 60 of FIGS. 3A and 3B. A discerning view of the cutlines shows a clear pattern. There are alternating cutlines of a first type and of a second type. Moving from bottom to top in the figure, cutline 162 is a shows a trapezoidal waveform cut that provides a bottom edge for a bar of chairs 160A. Cutline 164, immediately above cutline 162, is a generally linear cutline, with a plurality of saddle configurations 80, of the same type shown in FIG. 3A. In this case however, the arcuate region of the saddle configuration is centered over a horizontal valley in cutline 162, rather than being above a horizontal crest. Immediately above cutline 164 is cutline 166, which is a trapezoidal waveform cut that provides a bottom edge for a bar of chairs 160B. Note that cutline 164 provides the top edge of bar of chairs 160A and 160B, and that the negative saddle portions along cutline 164 for bar of chairs 160B result in metal removal for the bar of chairs 160B, which also has arcuate regions centered above a horizontal valley that occurs along cutline 166. Also note that, compared to cutline 162 cutline 166 is "phase shifted" to the right in order to achieve the centering in bar of chairs 160B.

By using a trapezoidal waveform in cutlines 162 and 166, the amplitude A of the waveform allows cutline 164 to be closer to the next cutline having saddle configurations (cutline 168), while still producing a bar of chairs 160 having a effective height H from the base to the arcuate portion. Over a large plate, this may result in additional bars of chairs 160.

Figure 5:
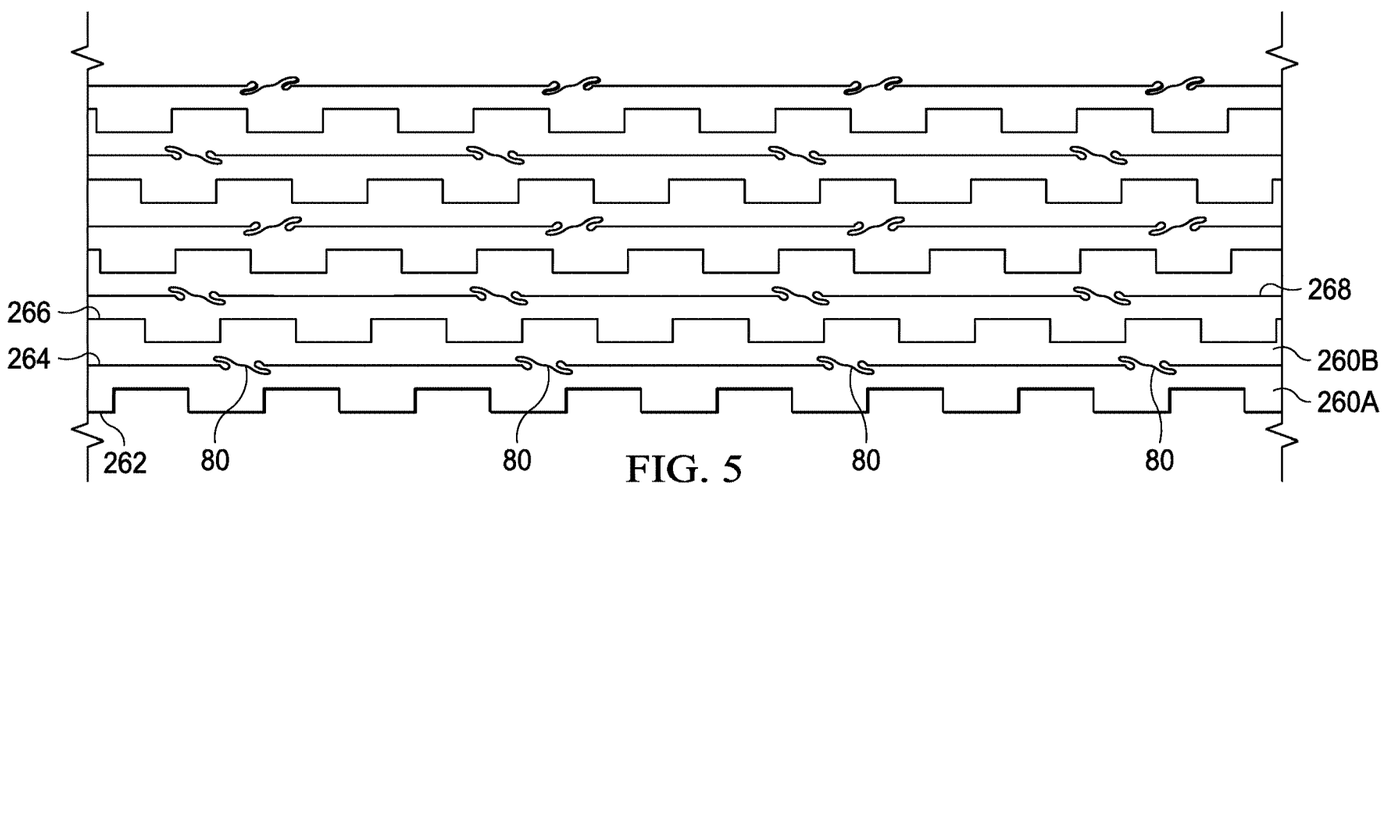
FIG. 5 is a plan view of a metal plate, showing cutlines used to produce a third embodiment of the chair for locating and retaining a rebar.

FIG. 5 will be recognized as being very similar to FIG. 4, but the waveform used along cutlines 262 and 266 is a square or rectangular waveform in which the "inclines" of the trapezoidal waveform become vertical steps up or down. However, the arcuate portions are centered above a horizontal valley. a plan view of a portion of a metal plate is disclosed, showing a pattern of cutlines to produce, with minimal material loss, a plurality of bars of chairs 260, which is a further variation on the chair bar 60 of FIGS. 3A and 3B. A discerning view of the cutlines shows a clear pattern. The are alternating cutlines of a first type and of a second type. Moving from bottom to top in the figure, cutline 262 is a shows a square waveform cut that provides a bottom edge for a bar of chairs 260A. Cutline 264, immediately above cutline 262, is a generally linear cutline, with a plurality of saddle configurations 80, of the same type shown in FIG. 3A. In this case however, the arcuate region of the saddle configuration is centered over a horizontal valley in cutline 262, rather than being above a horizontal crest. Immediately above cutline 264 is cutline 266, which is a another square waveform cut that provides a bottom edge for a bar of chairs 260B. Note that cutline 264 provides the top edge of bar of chairs 260A and 260B, and that the negative saddle portions along cutline 264 for bar of chairs 260B result in metal removal for the bar of chairs 260B, which also has arcuate regions centered above a horizontal valley that occurs along cutline 266. Also note that, compared to cutline 262, cutline 266 is "phase shifted" to the right in order to achieve the centering in bar of chairs 260B.

By using a square waveform in cutlines 262 and 266, the amplitude A (as seen in FIG. 3A) of the waveform allows cutline 264 to be closer to the next cutline having saddle configurations (cutline 268), while still producing a bar of chairs 260 having a effective height H from the base to the arcuate portion. Over a large plate, and as amplitude A increases relative to height H, this may result in additional bars of chairs 260 cut from a given plate of metal.

One of ordinary skill, in possession of the knowledge of the patterns of cutlines disclosed in FIGS. 4 and 5 will be able, upon a selection of the material and a specific thickness thereof, to determine an appropriate means for cutting to cut a plate of the material into strips of the chair bars as disclosed herein. These means would include laser cutting, water jet cutting and blade cutting, as well as other known means. It would be preferred to use a computer control algorithm to direct the cutting means.

What is claimed is:

1. A module for configuring a weighbridge, comprising:
a rectangular frame with a pair of parallel side edges and a pair of parallel end edges, the side edges longer than the end edges, with a pair of rails, parallel to the side edges and affixed to the end edges, the rails and the end edges defining an interior of the rectangular frame, arranged to have concrete poured therein; and
a plurality of rebar chair strips for locating and retaining rebars, each of the rebar chair strips being an elongate metal bar having a lower edge and an upper edge, wherein a plurality of rebar support sites are formed in the elongate metal bar in spaced-apart relationship along a length of the upper edge, each of the rebar support sites comprising:
a saddle portion defined by an arcuate region and a tongue, the arcuate region sized and adapted to seat a rebar therein and the tongue extending above and beyond the arcuate region, providing an essentially "C"-shaped opening which is closed by deforming the tongue onto the seated rebar; and
adjacent to the saddle portion, a "negative" saddle portion comprising a disc-shaped solid portion that corresponds in size to the arcuate region of the saddle portion and an open channel that corresponds in size to the tongue, the "negative" saddle portion positioned in a mirror image relationship with the saddle portion.

2. The module of claim 1, wherein:
the lower edge comprises, when viewed in profile, an alternating series of flat valleys and flat crests, the flat valleys defining base portions upon which the strip of rebar chairs can rest.

3. The module of claim 2, wherein:
the alternating series of flat valleys and flat crests are configured as a trapezoidal waveform with inclining and declining ramps between the flat valleys and flat crests.

4. The module of claim 2, wherein:
the alternating series of flat valleys and flat crests are configured as a square waveform with step-wise ramps between the flat valleys and flat crests.

5. The module of claim 1, further comprising:
a plurality of metal bars that run from one end edge to the other, each of the metal bars fixed in place at an incline from the vertical.

6. The module of claim 5, wherein:
each of the plurality of metal bars is inclined at an angle of between 10 and 20 degrees.

7. The module of claim 5, wherein:
the plurality of metal bars is positioned on each side of a center line of the module that runs from end edge to end edge, such that the plurality of metal bars on opposite sides of the center line are inclined in opposite directions.

8. The module of claim 7, wherein the inclined metal bars have an installed height that is lower that the height at which the rebar support sites retain the rebars, leaving the inclined metal bars and rebars independent of each other.

9. A strip of rebar chairs, comprising:
an elongate metal bar, comprising:
a lower edge; and
an upper edge, wherein a plurality of rebar support sites are formed in the elongate metal bar in spaced-apart relationship along a length of the upper edge;
wherein each of the rebar support sites comprises:
a saddle portion defined by an arcuate region and a tongue, the arcuate region sized and adapted to seat a rebar therein and the tongue extending above and beyond the arcuate region, providing an essentially "C"-shaped opening which is closed by deforming the tongue onto the seated rebar; and
adjacent to the saddle portion, a negative saddle portion comprising a disc-shaped solid portion that corresponds in size to the arcuate region of the saddle portion and an open channel that corresponds in size to the tongue, the negative saddle portion positioned in a mirror image relationship with the saddle portion.

10. The strip of rebar chairs of claim 9, wherein:
the lower edge comprises, when viewed in profile, an alternating series of flat valleys and flat crests, the flat valleys defining base portions upon which the strip of rebar chairs can rest.

11. The strip of rebar chairs of claim 9, wherein:
the lower edge comprises, when viewed in profile, an alternating series of flat valleys and flat crests, the flat valleys defining base portions upon which the strip of rebar chairs can rest.

12. The strip of rebar chairs of claim 10, wherein:
the alternating series of flat valleys and flat crests are configured as a trapezoidal waveform with inclining and declining ramps between the flat valleys and flat crests.

13. The strip of rebar chairs of claim 11, wherein:
the alternating series of flat valleys and flat crests are configured as a trapezoidal waveform with inclining and declining ramps between the flat valleys and flat crests.

14. The strip of rebar chairs of claim 10, wherein:
the alternating series of flat valleys and flat crests are configured as a square waveform with vertical steps between the flat valleys and flat crests.

15. The strip of rebar chairs of claim 11, wherein:
the alternating series of flat valleys and flat crests are configured as a square waveform with vertical steps between the flat valleys and flat crests.

16. A method for manufacturing, with minimal material loss, a strip of rebar chairs, the method comprising the steps of:
providing a metal plate having a length, width and a thickness;
cutting the metal plate into a plurality of strips along the length thereof, using an alternating sequence of two types of cutline, such that
a first of the two types of cutline provides a lower edge for a pair of the strips of rebar chairs and
a second of the two types of cutline provides an upper edge of a pair of the strips of rebar chairs, with the respective upper edges of the pair of the strips of rebar chairs having a plurality of rebar support sites arranged therealong;
wherein each of the rebar support sites positioned along the upper edges is a saddle configuration comprising a saddle portion and a negative saddle portion according to claim 9.

\* \* \* \* \*

UNITED STATES PATENT AND TRADEMARK OFFICE
CERTIFICATE OF CORRECTION

PATENT NO. : 10,982,444 B1  
APPLICATION NO. : 16/583636  
DATED : April 20, 2021  
INVENTOR(S) : Draper Page 1 of 1

It is certified that error appears in the above-identified patent and that said Letters Patent is hereby corrected as shown below:

On the Title Page

Item (10), Patent No.:, please delete "US 10,982,444 B1" and insert -- "US 10,982,444 B2" --.

Please insert -- (65), Prior Publication Data US 2021/0095472 A1 April 1, 2021 --.

In the Specification

In Column 2, Line 65, please delete "lower that the" and insert -- lower than the --.

In Column 5, Line 3, after "concrete" please insert -- . --.

In Column 5, Line 38, please delete "the" after "above".

In Column 6, Line 26, please delete "is a" before "shows".

In Column 6, Line 41, after "162" please insert -- , --.

In Column 6, Line 55, please delete ". a plan" and insert -- . A plan --.

In Column 6, Line 60, please delete "The are" and insert -- There are --.

In Column 6, Line 62, please delete "is a" before "shows".

In Column 7, Line 16, please delete "a" and insert -- an --.

In the Claims

In Column 8, Line 20, please delete "lower that the" and insert -- lower than the --.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*